3,539,551
STARCH ESTERS
Norman Edward Lloyd, Clinton, Iowa, assignor to Standard Brands Incorporated, New York, N.Y., a corporation of Delaware
No Drawing. Continuation-in-part of application Ser. No. 496,164, Oct. 14, 1965. This application Apr. 18, 1968, Ser. No. 722,196
Int. Cl. C08b 19/04
U.S. Cl. 260—233.5                      20 Claims

ABSTRACT OF THE DISCLOSURE

Starch mixed esters containing orthophosphate groups and orthophosphate groups esterified with a non-starch organic group. These starch mixed esters may contain from 0.05 to 1 mole of non-starch organic group per mole of bound phosphorous.

The starch mixed esters containing orthophosphate groups and orthophosphate groups esterified with a non-starch group are prepared by reacting starch with a substantially water soluble pyrophosphate diester at a temperature of from about 100° to 170° C. The said starch mixed esters are useful as improved adhesives, sizing agents for paper and textiles, as emulsion stabilizers and as thickeners for foods.

THE INVENTION

This application is a continuation in part of application Ser. No. 496,164, filed Oct. 14, 1965, now abandoned.

This invention relates to starch mixed esters containing orthophosphate groups and orthophosphate groups esterified with non-starch organic groups, and methods of preparing the same.

Starch mixed esters containing orthophosphate groups and orthophosphate groups esterified with non-starch organic groups, depending upon the reagents used and conditions of preparation, have properties which make them suitable for a large number of applications, for example, as improved adhesives and sizing agents for paper and textiles, as emulsion stabilizers and as thickeners for foods.

The starch mixed esters of the present invention may be produced by reacting a pyrophosphate diester with starch.

The term "starch" as used herein includes all raw starches such as corn, tapioca, potato, wheat, sago, arrowroot, rice and the like, and various modified starches and derivatives of starch, such as oxidized starches, starch ethers, starch esters and the like, the only requirement being that the starch contains free hydroxyl groups.

The starch mixed esters of the present invention will hereinafter be referred to as starch esters.

Preferably the starch esters of the present invention may be prepared, for instance, by forming a mixture of starch, water and a pyrophosphate diester derivatizing agent at a desirable pH, thus impregnating the starch granules with the derivatizing agent, separating the impregnated starch from the mixture by means well known in the art, i.e., filtration, decantation or centrifugation, drying the starch, if necessary, at a low temperature to a moisture content below about 25 percent and then heating the starch for a sufficient time to effect reaction between the starch and the derivatizing agent. If desired, the starch ester may be purified by washing with water, and/or a mixture of water and a water soluble organic solvent.

It has been found that the pH of the slurry containing the pyrophosphate diester, water, and starch plays an important part in determining the properties of the starch esters of the present invention. In general, the pH of the slurry may be adjusted to between about 4 and about 11 if it is desired to obtain thick-boiling starch esters. If the slurry is more acidic, the starch esters are depolymerized due to acid hydrolysis. For some applications, it may be desirable to produce starch esters of low viscosity (thin-boiling starches) in which case a starting slurry pH as low as about 1 may be used. If the slurry is highly alkaline, the starch esters undergo alkaline degradation. It appears that the higher the pH of the slurry (within the preferred range), the more viscous are starch esters when they are made into pastes by cooking in water. The increased viscosity characteristics of pastes of the starch esters prepared at the higher pH values may be due to the formation of a small proportion of cross-links within the starch granule.

The pH of the slurry also affects the mole ratio of non-starch organic groups to phosphate groups in the starch esters. Hereinafter, the use of the term "organic group" will connote a non-starch organic group. Starch esters prepared at a low slurry pH contain low mole ratios of organic groups to phosphate groups. This seems to indicate that a transesterification reaction is favored when a low slurry pH is used. Also, when a low slurry pH is used, it is possible that a small proportion of the organic phosphate ester bonds of the phosphate substituent groups is hydrolyzed. However, under the preferred reaction conditions of the present invention, where only a small amount of water is present, it is more likely that the transesterification reaction is favored.

After separation of the excess liquid from the impregnated starch, it is preferred to dry the impregnated starch at a low temperature to a moisture content below about 25 percent by weight to avoid substantial hydrolysis of the derivatizing agent. Also, gelatinization of the starch may be substantially avoided by maintaining a low drying temperature when it is desired to produce starch esters which retain the granule structure of untreated starch or are in the unswollen granule state. It is a preferred embodiment of the present invention to obtain a starch ester having the granule structure of untreated starch. The best results have been obtained by drying the impregnated starch at a temperature between about ambient temperature and 85° C. Of course, a vacuum may be used in order to facilitate the drying.

The resulting semi-dry starch impregnated with the derivatizing agent is heated, while further removing moisture, for a time sufficient to effect reaction between the starch and the derivatizing agent. The time and temperature are interdependent; that is, at low temperatures it is necessary to heat for longer periods of time than at higher temperatures to effect the same degree of reaction. The preferred temperature range is between about 100° and about 170° C. At temperatures substantially higher than 170° C. and at heating times greater than about 1 hour, discoloration and/or dextrinization of the starch esters may result. This makes the starch esters unsuitable for certain application, i.e., food uses, etc. The most desirable products are obtained by heating at temperatures between about 130° and about 160° C. for a time between about 2 and about 4 hours.

The starch esters may then be washed with water and/or a solution of water and a water miscible organic solvent, for example, methanol or acetone, to remove unbound phosphates which tend to reduce the viscosity of the starch esters when they are pasted in water.

While the present invention is not limited to any theory, it is believed that the reaction of a pyrophosphate diester with starch under the preferred conditions of the present invention involves principally esterification and transesterification. Possibly some hydrolysis may take place. Some of the reactions which may possibly take place are shown below.

(1) Esterification (a)
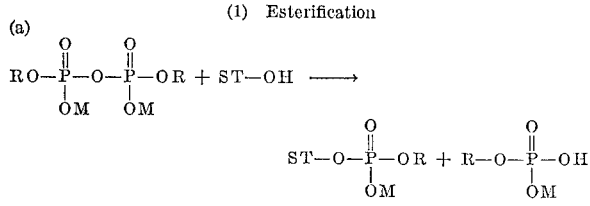

(b)
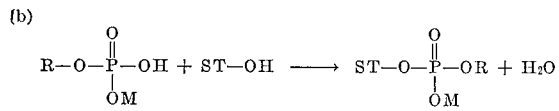

(2) Hydrolysis (a)
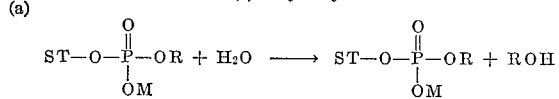

(b)
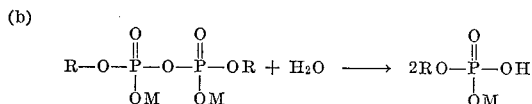

(c)
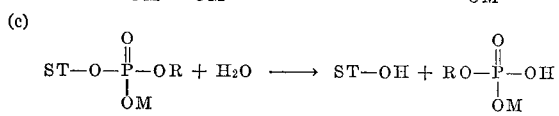

(3) Transesterification (a)
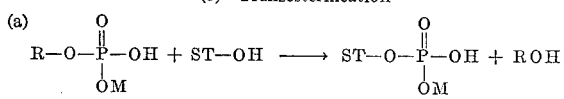

(b)
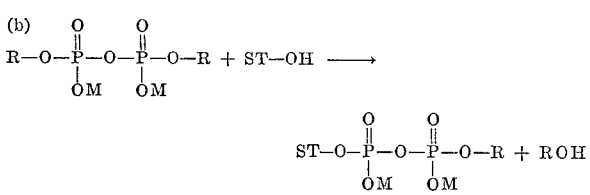

Where "ST" is starch.

Where "M" is hydrogen atom, a monovalent metal atom, ammonium, a primary amine, a secondary amine, a tertiary amine, or a quaternary amine group.

Where "R" is an organic group selected from the group consisting of:

(A) a hydrocarbon radical having up to 13 carbon atoms selected from the group consisting of alkyl, alkenyl, alkynyl, aralkyl, alkaryl, and alicyclic, (B) a hydrocarbon radical of A substituted with one or more radicals from the group consisting of fluoro, chloro, bromo, cyano, nitro, mercapto, carbamido, carbamyl, carboxyl, hydroxyl, carbalkoxy, alkoxy, polyalkoxy, guanido, primary amino, secondary amino and tertiary amino, (C) a heterocyclic radical containing from 2 to 6 carbon atoms and one or more atoms of oxygen, nitrogen and sulfur, and (D) ethylpolyoxyethyl and propylpolyoxypropyl.

Examples of organic groups which may be present are methyl, ethyl, propyl, butyl, octyl, dodecyl, isopropyl, isobutyl, t-butyl, 2-ethylhexyl, 3-propyloctyl, 8-ethyldecyl, 1-methylpropyl, vinyl, allyl, butenyl, propenyl, butadienyl, butynl, dodecynyl, protyl, 2 - propyloctemyl $\Delta^1$—, cyclopropyl, cyclopentyl, cyclohexyl, phenyl, naphthyl, tolyl, xylyl, 2 - methylnaphthyl, 3 - ethylnaphthyl, o-isopropylphenyl, p - vinylphenyl, 6 - vinylnaphthyl, phenethyl, styryl, alpha - methylstyryl, benzyl, alpha - methylcyclohexyl, p - isopropylphenyl, o - (2-ethylhexyl)-phenyl, 2-phenylbutyl, chloromethyl, chloro-ethyl, chloropropyl, 8-cyanodecyl, o-chloromethylphenyl, bromoethyl, alpha-chlorocyclohexyl, o-bromophenyl, 10-chloro-2-methyldodecynyl, aminopropyl, carboxyethyl, p-methoxyphenyl, diethylaminoethyl, diphenylaminoethyl, beta-ethylcycloheptyl, carbamylethyl, m-carbamylphenyl, 3-carboxynapthyl, hydroxyethyl, hydroxypropyl, N,N-dimethylcarbamylethyl, methoxyethyl, 4-hydroxybutynyl $\Delta^2$—, o-polyethoxyphenyl, o-isopropylphenethyl, o,p-dichlorophenyl, acetamidoethyl, acetimidobutyl, acetonylethyl, alanylethyl, 2-allyl-3-chlorophenyl, aminoethyl, 3-analinopropyl, anisoylethyl, benzamidoethyl, p-benzoxyphenyl, benzoylethyl, m-butoxy-p-nitrophenyl, butyl secondary, 2-carbamidopropyl, beta-carbamylcyclopentyl, cinnamylpropyl, o-crotonylphenyl, o-cyanophenyl, propylpolyoxypropyl, ethylpolyoxyethyl, 2,3-dihydoxypropyl, glycolylethyl, guarnidopropyl, 2 - hydroxyaminopropyl, mercaptoethyl, naphthoxyethyl, 3-nitropropyl, phenacyl, p-propionylphenyl, salicyl, salicylylethyl, o-sulfaminophenyl, sulfamylethyl, toluinoethyl, trichloro acetylpropyl, trifluoroacetylpropyl, thiophenyl, pyrolyl, furanyl, carbazolyl, pyridinyl, quinolinyl, morpholinyl, piperidinyl, isoquinolinyl, pyranyl, pyrazolyl, imidazolyl, pyridazinyl, and pyrimidinyl.

Esterification reaction 1a shows that the pyrophosphate diester may react with a starch hydroxyl to form a monostarch monoorganic phosphate derivative, and that an organic orthophosphate ester is generated. In this reaction, one acidic hydrogen is produced (that contained in the organic orthophosphate ester). Thus, as the reaction proceeds, the pH of the reaction mixture should decrease. Decreasing pH of the reaction mixture has been observed in the process of the present invention. Esterification may also occur according to 1b. However, under the preferred conditions of the present invention, it would seem that the reaction proceeds predominantly according to 1a. In addition, some hydrolysis may also occur. The hydrolysis of the starch organic phosphate ester group as in 2a would result in the formation of a starch orthophosphate plus an alcohol. In 2b, hydrolysis of the derivatizing agent is shown. In 2c, hydrolysis of the ester bond between the starch and an organic phosphate group is shown. Obviously, hydrolysis according to 2b and 2c are undesirable. The hydrolysis reactions would not be expected to occur to any great degree in the process of the present invention, since reaction conditions are maintained to avoid the same. This is accomplished by maintaining a low slurry temperature, and during the reaction step avoiding an excess of moisture. In the transesterification reaction shown in 3a, one mole of organic orthophosphate (generated as a by-product of the esterification reaction) may react with a starch hydroxyl to form a starch orthophosphate plus the corresponding alcohol. This reaction would seem to be favored when the reaction mixture is acidic and/or when the reaction temperatures are high. Reaction 3b would result in a starch pyrophosphate ester. However, if such pyrophosphate ester were formed, it would be expected that further reaction with another starch hydroxyl would occur to form an intermolecular crosslink as shown by the following reaction.

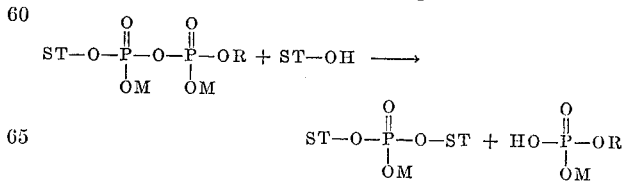

Slight crosslinking of granular starch is easily detected by determinations of paste viscosity and paste clarity. The paste viscosity and paste clarity of the starch esters of the present invention indicate that only slight crosslinking may occur when the reaction mixture is alkaline. Thus it is not believed that reaction 3b is favored in producing the starch esters of the present invention. Because of this, it is believed that the predominant substituent groups of the starch esters produced by the process of the present invention are the orthophosphate group.

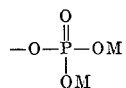

and organic orthophosphate ester group,

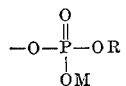

where R and M are defined above.

In order for the esterification reaction of the present invention to proceed, the pyrophosphate diesters must be at least slightly water soluble under the slurry conditions of the present invention, for instance at slurry temperatures in the range of 0° to 85° C. and preferably from 20° to 50° C. Preferably, the pyrophosphate diesters should be substantially water soluble, for instance more than 5 g. in 100 ml. of water at ambient temperature. Also, the organic group should be substantially nonreactive with the starch molecule if it is desired to produce a non-crosslinked starch ester.

Typically, the starch esters will contain between about 0.05 and about 1 mole of organic group per mole of phosphorous. Preferably, however, the starch esters will contain between about 0.3 and about 0.6 mole of organic group per mole of phosphorous. Advantageously, when the starch esters contain between about 0.05 and about 1 mole of organic group per mole of phosphorous, the phosphorous content will be from about 0.001 to about 0.1 mole of phosphorous per mole of anhydroglucose unit (molecular weight 162). Preferably, the phosphorous content of the starch esters will be from about 0.001 to 0.05 mole of phosphorous per mole of anhydroglucose unit.

The preferred pyrophosphate diesters are those selected from the alkyl pyrophosphates. A particularly preferred alkyl pyrophosphate is dimethyl pyrophosphate. When the starch ester of the present invention is to be used as an emulsion stabilizer, it is preferred that the pyrophosphate diester be di-2-ethylhexyl pyrophosphate.

In order to more clearly describe the nature of the present invention, specific examples will hereinafter be described. It should be understood, however, that this is done solely by way of example and is intended neither to delineate the scope of the invention nor limit the ambit of the appended claims. In the examples and throughout the specification, percentages are intended to refer to percent by weight unless otherwise specified.

The analytical procedures and testing methods referred to in this specification were carried out as follows:

To determine viscosity, a slurry containing 6 grams of the starch ester per 100 ml. of slurry was heated in a viscometer to 95° C., held at 95° C. for 30 minutes, then cooled to 50° C., held at 50° C. for an additional 30 minutes, and the viscosity determined. The viscometer was a Brabender VISCO/Amylo/Graph made by C. W. Brabender Instruments Inc.

The phosphorous content of the air-dried filter cakes was determined by placing a one-half gram sample of the filter cake into a platinum crucible and adding 2 ml. of a 3 percent sodium carbonate solution. The mixture was heated on a hot plate to remove water, charred over a flame, and ignited in a muffle furnace at 600° C. for 18 hours. The sample was then cooled, 2 drops of concentrated nitric acid added, and the sample returned to the muffle furnace at 600° C. for 30 minutes. The sample was cooled, 10 ml. of concentrated nitric acid added and the phosphorous determination completed as described in "Official Methods of Analysis," A.O.A.C., Tenth Edition, 1965, Section 2.028(a). From the phosphorous content the pyrophosphate diester content of the filter cake was calculated.

The pH of the filter cake after the air-drying step and the pH of the reaction mixture after the heating step was determined by suspending 10 g. of filter cake in 50 ml. of distilled water, stirring 5 minutes, and then measuring the pH of the slurry with a glass electrode.

The phosphorous and organic contents of the mixed esters of the present invention were determined by the following procedure:

Sixteen grams of the starch ester was suspended in 150 ml. of a solution composed of equal parts by volume of 0.1 N hydrochloric acid and acetone, and stirred for 5 minutes. The suspension was then filtered on a coarse sintered glass funnel 3½" in diameter with gentle vacuum. Just before the last of the supernatant liquid passed through the filter cake, a 150 ml. aliquot of the acid-acetone mixture was added and filtration continued. Three additional 150 ml. portions of the acid-acetone solution were added and filtered through the cake in like manner. The filter cake was treated in like manner with four 150 ml. portions of a solution composed of equal parts by volume acetone and demineralized water, and the filtration completed. The filter cake was then suspended in 150 ml. of the acetone-demineralized water solution, stirred for 5 minutes, and again filtered. It was washed with the acetone-demineralized water solution until free of chloride (silver nitrate test), and finally washed by passing 150 ml. of acetone through the cake.

The filter cake was allowed to air dry on the funnel. The starch ester completely in the free acid form was then suspended in demineralized water to obtain a 267 ml. slurry. Exactly one-half of the slurry was then titrated with a 0.1 N sodium hydroxide solution by the use of an automatic titrator which recorded the pH of the slurry as a function of the volume of the 0.1 N sodium hydroxide solution added. The ratio of moles of phosphorous per mole of anhydroglucose unit (P/AGU), and the moles of organic group per mole of anhydroglucose unit (OR/AGU) were calculated as follows:

$$P/AGU = \frac{162 V_1 N}{1000 W}$$

162 = molecular weight of anhydroglucose unit.
$V_1$ = volume (ml.) of NaOH solution required to reach the first inflection point on the titration curve (at pH 6) corresponding to complete neutralization of the first titratable hydrogen (strong acid group).
N = normality of NaOH solution (0.1 N).
W = weight of starch ester (8 g.).

$$OR/AGU = \frac{162 N (3V_1 - 2V_2)}{1000 W}$$

$V_2$ = volume (ml.) of NaOH solution required to reach the second inflection point on the titration curve (at about pH of 8.2) corresponding to complete neutralization of first titratable hydrogen (strong acid group) and half neutralization of the second titratable hydrogen (weak acid group).

For purposes of the present invention, the starch esters are defined in terms of the results obtained by the analytical procedure above, since if other analytical procedures are used some variation of the phosphorous and organic group content of the starch esters may be obtained.

As discussed above, two types of substituent groups should predominate in the starch esters; namely, an organic phosphate ester group for which there is one strong acid group per phosphorous molecule, and an orthophosphate group for which there is one strong and one weak acid group per phosphorous molecule. Titration of the acid forms of the starch esters with dilute sodium hydroxide gave titration curves typical of a di-basic acid. In the titration curves, the first inflection point occurred at a pH of 6, corresponding to neutralization of the strong acid groups. Since there is one strong acid group per molecule of phosphorous in both the orthophosphate group and the organic phosphate ester group, the amount of alkali required to neutralize to pH 6 is equivalent to the phosphorous content of the starch ester. The second inflection point (when discernible) occurred at a pH of about 8.2 at which the strong acid groups were completely neutralized and the weak acid groups were half neutralized. It was not feasible to completely neutralize the weak acid groups since a pH in excess of 9 would be required. At a pH above 9, the starch itself adsorbs appreciable quantities of sodium hydroxide.

EXAMPLES 1–4

These examples illustrate the effects of the initial pH of the slurries on the efficiency of the reaction, and on the viscosity of aqueous pastes of the starch esters produced.

In Example 1, 41.2 g. of dimethyl acid pyrophosphate was added slowly to 223 ml. of a 1.53 N sodium hydroxide solution. The addition was made slowly with cooling. Then, a wet filter cake composed of 324 g. of corn starch and 277 g. of water was added, and the resulting slurry stirred for 30 minutes at 50° C. The pH of the slurry was 3.

In Example 2, a slurry was prepared at a pH of 5 in the same manner as shown in Example 1, except that 221 ml. of a 1.65 N sodium hydroxide solution was used.

In Example 3, the dimethyl acid pyrophosphate was added to 500 ml. of a 0.8 N sodium hydroxide solution. This solution was cooled, and 324 g. (dry basis) of corn starch added. The pH of the slurry was 8.5.

In Example 4, a slurry was prepared at a pH of 10 in the same manner as shown in Example 1, except that 259 ml. of a 2 N sodium hydroxide solution was used.

After the slurries were stirred for 30 minutes at 50° C., they were filtered on a Buchner funnel with vacuum in order to remove excess liquid. The resulting filter cakes were air-dried.

The air-dried filter cakes were heated for two hours at 130° C. in a forced air oven. During the heating step, the pH of all of the products decreased indicating that acidic groups had been generated. After the heating step, the products were purified by washing repeatedly with water or with aqueous methanol solutions.

As seen from the following table, the pH of the slurries affected the paste viscosity of the starch esters markedly. The slurry prepared at a pH of 3 gave a starch ester which was depolymerized as indicated by a viscosity considerably lower than that of a paste of unmodified corn starch. Starch esters prepared at higher slurry pH's gave higher viscosities. At a slurry pH of 10, the paste viscosity of the starch ester was about 4 times the viscosity of a paste of unmodified corn starch. Pastes of all of the starch esters were considerably clearer than pastes of unmodified corn starch.

Reaction efficiencies varied from 26 to 46 percent and generally increased with decreasing slurry pH due chiefly to increased formation of orthophosphate groups.

EXAMPLES 5–8

These examples illustrate the effects of heating at different temperatures.

In these examples, the starch esters were prepared in the manner described in Example 4, with the exception that the air-dried filter cakes were heated at temperatures ranging from 140° to 170° C. The table shows that reaction efficiency increased with increasing temperatures. Generally at higher temperatures, the starch esters contained lower mole ratios of organic group to phosphorous group (OR/P).

The starch esters were extremely thick-boiling. The starch esters of Examples 7 and 8 were so viscous that final viscosities of 6 percent pastes prepared in the Brabender VISCO/amylo/Graph were beyond the range of the instrument (i.e., above 2500 Brabender units). This necessitated that their paste viscosities be determined at a concentration of 4 g. of starch ester per 100 ml. of slurry. All of the starch esters gave smooth pastes which were perceptibly clearer than pastes of unmodified corn starch.

EXAMPLES 9–13

These examples illustrate the preparation of starch esters containing different organic groups.

The starch esters were prepared and purified by the procedure described in Example 3.

Reaction efficiencies varied with the type of organic group in the pyrophosphate diester. In general, the greater the number of carbon atoms in the organic group, the lower the reaction efficiency. This was probably due to steric hindrance. Owing to the low degrees of substitution, it was not possible to ascertain the second inflection points in the titration curves of the starch esters of Examples 11, 12, and 13. Consequently, the moles of organic groups could not be calculated. All of the starch esters tested gave pastes more viscous and clearer than an unmodified corn starch paste.

EXAMPLE 14

This example illustrates the preparation of a starch ester and its use as an emulsion stabilizer.

The starch ester of this example was prepared in the manner described in Example 3, with the exception that the amount of dimethyl pyrophosphate used was doubled. Doubling the amount of the dimethyl pyrophosphate approximately doubled the amount of phosphorous in the final product. The paste viscosity of this starch ester was increased over that of the starch ester of Example 3.

The starch ester was tested as a stabilizing agent for a corn oil-water emulsion. An aqueous paste containing 1 percent by weight of the starch ester was prepared. A few drops of a phenyl mercuric acetate solution, as a preservative, was added to the paste, and an equal volume of corn oil containing a red dye was incorporated therein. An emulsion was formed by passing the mixture 3 times through a hand homogenizer. The resulting emulsion, when tested by the method for determining average particle diameter described by Lloyd in the Journal of Colloid Science, 14: 441–451 (1959), showed an initial surface average particle diameter of 4.6 microns for the dispersed oil phase. The emulsion upon standing for 48 days at room temperature showed no change in average particle diameter. Thus, the emulsion containing the starch ester was very stable. An emulsion prepared and tested in the same manner using a paste of unmodified corn starch as the stabilizer showed an initial average particle diameter of 32.5 microns for the dispersed oil phase. The emulsion upon standing for 3 days at room temperature showed a doubling of average particle diameter. Thus, the emulsion was not stable.

EXAMPLE 15

This example illustrates the preparation of a starch ester containing the 2-ethylhexyl group and its ability to stabilize a corn oil-water emulsion.

Twenty-one and two-tenths g. of sodium carbonate was dissolved in 464 ml. of water, and 814 g. of di-2-ethylhexyl acid pyrophosphate was added slowly with stirring. A precipitate formed which redispersed and partially dissolved on further stirring to give a milky solution. The temperature of the solution was brought to 50° C., and 360 g. of corn starch containing 10 percent moisture was slurried therein. The slurry was stirred for a total of 45 minutes, its pH determined and the slurry filtered. The filter cake was broken up and air-dried. The air-dried mixture was heated in a forced air-oven for 4 hours at 160° C. After cooling, its pH was determined and the starch ester purified. The purified material was air-dried. When this starch ester was tested as an emulsion stabilizer, as described in the previous example, it gave an emulsion with an initial average particle diameter of 4.3 microns.

The emulsion on standing for 45 days at room temperature showed no change in average particle diameter.

EXAMPLE 16

This example illustrates the preparation of a starch ester containing a high mole ratio of phosphorous to starch.

One hundred ml. of demineralized water was placed in a beaker and cooled in an ice bath. Then 124 g. of dimethyl acid pyrophosphate and 400 ml. of 3 N NaOH were added slowly simultaneously to the water with agitation. The pH of the solution was adjusted to 8.5, and 324 g. of corn starch was suspended therein. The resulting slurry was held at 50° C. for 30 minutes. The slurry was filtered by the use of a Buchner funnel under vacuum. The filter cake was broken up and air-dried for about 16 hours at ambient temperature. The pH of the air-dried cake was 7.3. The air-dried cake was then heated for two hours at 140° C. in a forced air oven. The pH after heating was 6.3. The cake was washed by suspending it in 500 ml. of a solution containing one part acetone and one part demineralized water, and then was filtered. This washing procedure was repeated five times. The final filter cake was air-dried. Analysis of this product is shown in the following table.

The terms and expressions which have been employed are used as terms of description and not of limitation, and it is not intended to exclude any equivalents of the features shown and described or portions thereof, since it is recognized that various modifications are possible within the scope of the invention claimed.

| Ex. No. | Organic group | Moles pyrophosphate diester per mole starch in the air-dried filter cake | pH Slurry | pH After air-drying | pH After heating | Heating conditions Time (hrs) | Heating conditions Temp. (° C.) | Titration analysis P/AGU | Titration analysis OR/AGU | Titration analysis OR/P | Total reaction efficiency,[1] percent | Final Brabender viscosity (Brabender units) |
|---|---|---|---|---|---|---|---|---|---|---|---|---|
| 1 | Methyl | 0.048 | 3.0 | 3.1 | 3.0 | 2.0 | 130 | 0.0213 | 0.0027 | 0.13 | 44 | 65 |
| 2 | do | 0.042 | 5.0 | 5.3 | 4.3 | 2.0 | 130 | 0.0195 | 0.0060 | 0.31 | 46 | 460 |
| 3 | do | 0.028 | 8.5 | 7.8 | 6.8 | 2.0 | 130 | 0.0095 | 0.0030 | 0.33 | 34 | 1,285 |
| 4 | do | 0.036 | 10.0 | 10.1 | 9.3 | 2.0 | 130 | 0.0083 | 0.0051 | 0.61 | 26 | 2,120 |
| 5 | do | 0.037 | 10.0 | 8.8 | 6.9 | 2.0 | 140 | 0.0137 | 0.0066 | 0.48 | 37 | 1,560 |
| 6 | do | 0.037 | 10.0 | 8.8 | 6.9 | 2.0 | 150 | 0.0164 | 0.0081 | 0.49 | 44 | 1,800 |
| 7 | do | 0.037 | 10.0 | 8.8 | 6.8 | 2.0 | 160 | 0.0233 | 0.0102 | 0.44 | 63 | [2]1,210 |
| 8 | do | 0.037 | 10.0 | 8.8 | 6.7 | 2.0 | 170 | 0.0300 | 0.0060 | 0.20 | 81 | [2]1,190 |
| 9 | Ethyl | 0.032 | 8.5 | 8.0 | 7.2 | 2.0 | 130 | 0.0085 | 0.0024 | 0.28 | 27 | 1,340 |
| 10 | Butyl | 0.023 | 8.5 | 7.9 | 7.1 | 2.0 | 130 | 0.0057 | 0.0039 | 0.67 | 27 | 950 |
| 11 | Iso-amyl | 0.022 | 8.5 | 8.0 | 7.4 | 2.0 | 130 | 0.0039 | | | 18 | 1,090 |
| 12 | 2-ethylhexyl | 0.036 | 8.5 | 7.4 | 7.1 | 2.0 | 130 | 0.0051 | | | 14 | 930 |
| 13 | Octyl | 0.025 | 8.5 | 8.1 | 7.8 | 2.0 | 130 | 0.0020 | | | 8 | |
| 14 | Methyl | 0.057 | 8.5 | 7.8 | 6.6 | 2.0 | 130 | 0.0200 | 0.0088 | 0.44 | 35 | 1,470 |
| 15 | 2-ethylhexyl | 0.041 | 6.6 | | 5.4 | 4.0 | 160 | 0.0138 | 0.0060 | 0.44 | 34 | |
| 16 | Methyl | | 8.5 | 7.3 | 6.3 | 2.0 | 140 | 0.0410 | 0.0127 | 0.32 | | |
| Unmodified corn starch | | | | | | | | | | | | 580 |

[1] Mole ratio of P to AGU in the mixed ester expressed as a percentage of the mole ratio of pyrophosphate to AGU in the dried filter cake just prior to the heating step.  
[2] Concentration, 4%.

What is claimed is:

1. Starch mixed esters having substituent groups represented by the formulas,

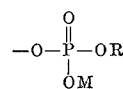

and

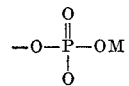

wherein M is selected from the group consisting of hydrogen, a monovalent metal, ammonium, a primary amine, a secondary amine, a tertiary amine and a quaternary amine; and wherein R is an organic group selected from the group consisting of:
  (A) a hydrocarbon radical having up to 13 carbon atoms, selected from the group consisting of alkyl, alkenyl, alkynyl, aralkyl, alkaryl and alicyclic,
  (B) a hydrocarbon radical of A substituted with one or more radicals from the group consisting of fluoro, chloro, bromo, cyano, nitro, mercapto, carbamyl, carboxyl, hydroxyl, carbalkoxy, alkoxy, guanido, polyalkoxy, carbamido, primary amino, secondary amino and tertiary amino, and
  (C) a heterocyclic radical containing from 2 to 6 carbon atoms and one or more atoms of oxygen, nitrogen and sulfur, and
  (D) ethylpolyoxyethyl and propylpolyoxypropyl.

2. Starch mixed esters as defined in claim 1, wherein the esters contain between about 0.05 and 1 mole of the organic group per mole of phosphorous.

3. Starch mixed esters as defined in claim 2, wherein the esters contain between about 0.3 and about 0.6 mole of the organic group per mole of phosphorous.

4. Starch mixed esters as defined in claim 2, wherein the phosphorous content of the esters is from about 0.001 to about 0.1 mole of phosphorous per mole of anhydroglucose.

5. Starch mixed esters as defined in claim 4, wherein the phosphorous content of the esters is from about 0.001 to about 0.05 mole of phosphorous per mole of anhydroglucose.

6. Starch mixed esters as defined in claim 1, wherein the esters are substantially non-crosslinked.

7. Starch mixed esters as defined in claim 1, wherein the organic group is a hydrocarbon radical containing up to 13 carbon atoms.

8. Starch mixed esters as defined in claim 1, wherein the organic group is a substituted hydrocarbon radical containing up to 13 carbon atoms in the hydrocarbon moiety.

9. Starch mixed esters as defined in claim 1, wherein the organic group is a heterocyclic radical containing from 2 to 6 carbon atoms.

10. Starch mixed esters as defined in claim 1, wherein the organic group is ethylpolyoxyethyl or propylpolyoxypropyl.

11. Starch mixed esters as defined in claim 2, wherein the organic group is an alkyl group containing up to 13 carbon atoms.

12. Starch mixed esters as defined in claim 11, wherein the organic group is an alkyl group containing from 1 to 8 carbon atoms.

13. Starch mixed esters as defined in claim 4, wherein the esters are in an unswollen granule state.

14. A method for preparing starch mixed esters comprising reacting starch with a substantially water soluble pyrophosphate diester at a temperature of from about 100° to 170° C., the pyrophosphate diester being represented by the general formula,

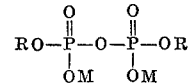

wherein M is selected from the group consisting of hydrogen, a monovalent metal, ammonium, a primary amine, a secondary amine, a tertiary amine, and a quaternary amine; and wherein R is an organic group selected from the group consisting of:
- (A) a hydrocarbon radical having up to 13 carbon atoms, selected from the group consisting of alkyl, alkenyl, alkynyl, aralkyl, alkaryl, and alicyclic,
- (B) a hydrocarbon radical of A substituted with one or more radicals from the group consisting of fluoro, chloro, bromo, cyano, nitro, mercapto, carbamyl, carboxyl, hydroxyl, carbalkoxy, alkoxy, guanido, polyalkoxy, carbamido, primary amino, secondary amino and tertiary amino and
- (C) a heterocyclic radical containing from 2 to 6 carbon atoms and one or more atoms of oxygen, nitrogen and sulfur, and
- (D) ethylpolyoxyethyl and propylpolyoxypropyl.

15. A method for preparing starch mixed esters as defined in claim 14, comprising heating starch granules impregnated with a substantially water soluble pyrophosphate diester and containing less than 25 percent by weight moisture, at a temperature from about 100 to 170° C., while permitting evaporation of water, for a time to effect reaction between the pyrophosphate diester and the starch.

16. A method for preparing starch mixed esters as defined in claim 15, wherein the starch granules are impregnated with a water solution of a pyrophosphate diester, said water solution of pyrophosphate diester having a pH in the range of from about 1 to about 11.

17. A method for preparing starch mixed esters as defined in claim 16, wherein the pH of the water solution of the pyrophosphate diester is in the range of from about 4 to about 11.

18. A method for preparing starch mixed esters as defined in claim 16, wherein the starch mixed esters are washed to remove unbound phosphates from the mixed esters.

19. A method for preparing starch mixed esters as defined in claim 17, wherein the impregnated starch granules are heated to within a temperature range of from about 130° to about 160° C. for about two to four hours.

20. A method for preparing starch mixed esters as defined in claim 17, wherein the pyrophosphate diester is an alkyl pyrophosphate diester.

References Cited

UNITED STATES PATENTS

| | | | |
|---|---|---|---|
| 2,801,242 | 7/1957 | Kerr et al. | 260—233.5 |
| 2,884,413 | 4/1959 | Kerr et al. | 260—233.5 |
| 2,961,440 | 11/1960 | Kerr et al. | 260—233.5 |
| 2,993,041 | 7/1961 | Sietsema et al. | 260—233.5 |

FOREIGN PATENTS 855,731  12/1960  Great Britain.

DONALD E. CZAJA, Primary Examiner

M. I. MARQUIS, Assistant Examiner

U.S. Cl. X.R.

99—139; 117—165; 260—233.3

UNITED STATES PATENT OFFICE
CERTIFICATE OF CORRECTION

Patent No. 3,539,551     Dated November 10, 1970

Inventor(s) Norman E. Lloyd

It is certified that error appears in the above-identified patent and that said Letters Patent are hereby corrected as shown below:

In column 4, line 19, the compound "trichloro acetylpropyl" should appear --trichloroacetylpropyl--; line 54, after the word "high" a period should be inserted. Column 7, line 9, the word "absorbs" should read --adsorbs--. In Claim 1, second formula reading $$-O-\overset{\overset{O}{\|}}{P}-OM$$

should read $$-O-\overset{\overset{O}{\|}}{\underset{\underset{OM}{|}}{P}}-OM .$$

Signed and sealed this 15th day of June 1971.

(SEAL)
Attest:

EDWARD M. FLETCHER, JR.
Attesting Officer

WILLIAM E. SCHUYLER,
Commissioner of Patents